W. F. BLACK.
FLANGE LUBRICATOR FOR CAR WHEELS.
APPLICATION FILED OCT. 19, 1915.
1,196,509.
Patented Aug. 29, 1916.
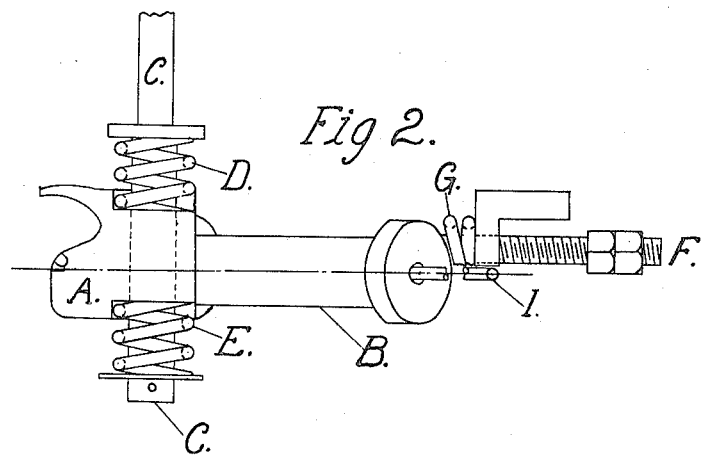
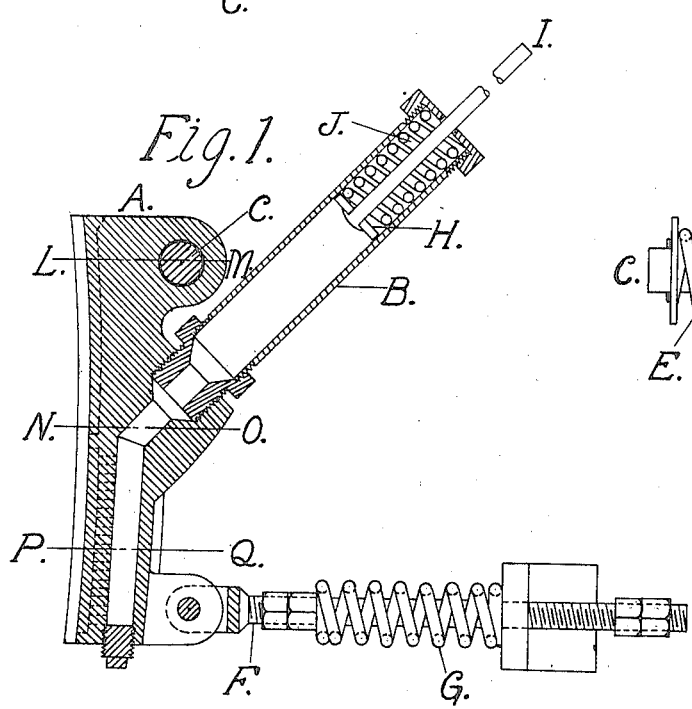
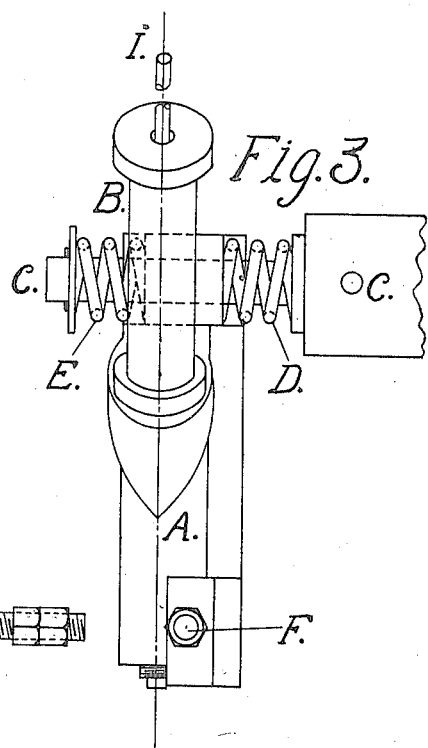
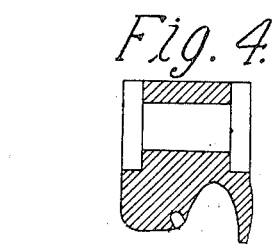
Section at L.M.   Section at N.O.   Section at P.Q.
Witnesses.
George W. Stroh
William L. Lentz
Inventor.
William Frederick Black.

UNITED STATES PATENT OFFICE.

WILLIAM FREDERICK BLACK, OF JERSEY SHORE BOROUGH, PENNSYLVANIA, ASSIGNOR OF ONE-HALF TO HARRY SAMUEL RAUCH, OF JERSEY SHORE, PENNSYLVANIA.

FLANGE-LUBRICATOR FOR CAR-WHEELS.

1,196,509.   Specification of Letters Patent.   Patented Aug. 29, 1916.

Application filed October 19, 1915.   Serial No. 56,806.

*To all whom it may concern:*

Be it known that I, WILLIAM FREDERICK BLACK, a citizen of the United States, residing in the borough of Jersey Shore, in the county of Lycoming and State of Pennsylvania, have invented a new and useful Flange - Lubricator for Car - Wheels, of which the following is a specification.

My invention relates to a device for the application of a lubricant in solid or semi-solid form to the flanges of tires and wheels of locomotives and cars.

This invention provides, first, for a device which will be continuously in contact with the throat of the flange of the tire or wheel of a locomotive or other vehicle, thereby placing the lubricant where it is most needed; second, for a continuous and cheap lubrication of the flange, thereby preventing the cutting of the flange when coming in contact with the rail; third, for a lubrication which will protect the flanges as above stated without obscuring the vision of those employed in the operation of cars and locomotives by the use of steam; fourth, for an automatic feed of the lubricant to the wheel regulated by the heat developed by the frictional contact of a portion of the lubricator with the wheel; and fifth, for a convenient and readily operated adjustment of the amount of lubricant supplied to the wheel. I attain these objects by the mechanism illustrated in the accompanying drawings which show the preferred embodiment of my invention, and in which—

Figure 1 is a vertical section of the lubricator; Fig. 2 is a top or plan view of the same; Fig. 3 is a rear elevation; and Figs. 4, 5 and 6 are cross sections on lines L—M, N—O and P—Q respectively of Fig. 1.

The shoe A is pivotally suspended from the stationary rod or bracket C mounted on the locomotive adjacent to the periphery of the wheel. The shoe may turn about bracket C and also it may move axially of the rod. Its axial movement upon the rod is effected against one or the other of two coiled springs D and E which bear upon opposite sides of the shoe A. The shoe is therefore adapted to yield laterally against the tension of one of the springs so that it can readily follow the flange of the wheel. The face of the shoe is grooved as shown in Fig. 2 to correspond with the shape of the periphery of the wheel. The movement of the shoe about the bracket C is effected by spring-rod F and spring G, one end of rod F being pivotally connected to the lower end of the shoe. The other end of the rod passes through an opening in a bracket mounted stationarily upon the locomotive and the spring G is coiled about rod F between the bracket and a nut whose position is adjustable upon a threaded portion of the rod F. The spring F urges the lower end of the shoe A toward the periphery of the wheel and thus generates heat by reason of the frictional contact of the shoe with the wheel, the amount of the friction being dependent upon the tension of spring G.

The lubricant is placed in the container B which may be a cylinder having one end threaded and adapted to be received in a threaded opening in shoe A. The lubricant is pressed forward in the cylinder B by a piston H actuated by a spring J coiled about the rod I of the piston. The cylinder B communicates with a receptacle formed within the shoe A and a plurality of orifices lead from this receptacle to the surface of the portion of the shoe which contacts with the periphery of the wheel at the throat of the flange thereon. These orifices are indicated by dotted lines in Fig. 1 and one of them is shown in section in Fig. 6. If desired a lengthwise groove may be provided upon the face of a shoe A where the latter contacts with the throat of the flange of the wheel; such a groove is indicated by dotted lines in Fig. 1 and is shown in Figs. 2, 4, 5 and 6.

In the use of the device the lubricant is placed in the cylinder B and is forced by the spring J and piston H down into the receptacle formed in the shoe A. The spring G presses the shoe constantly against the surface of the wheel by turning the shoe slightly about the rod C and holds the shoe in contact with the wheel with such pressure that heat is developed by reason of the friction. This heat in the shoe A, particularly the lower portion of the shoe about the receptacle for the lubricant therein, softens the lubricant and the latter, when in the softened condition, passes out through the orifices, above referred to, and is deposited upon the periphery of the wheel at the throat of the flange thereon where it is most needed. A relatively light pressure of the shoe upon the wheel is ample to develop the required heat and this pressure may be readily adjusted by turning the nuts upon the rod F so as to regulate the tension of the spring G. Also the springs D, E and G which position the shoe hold it yieldingly in position so that it can readily follow the wheel throughout all movements of the wheel relatively to the frame of the locomotive. The lubricant used is a semi-solid lubricant which will pass down into the receptacle in the shoe under the pressure of the spring J but will not flow out through the small orifices leading to the surface of the shoe until it has been more or less reduced by heating. Waste of lubricant is thus avoided and moreover it is possible to use a very inexpensive lubricant. This lubricant is supplied to the wheel at a rate which is automatically regulated in accordance with the pressure of the shoe upon the wheel, that is, at a rate dependent upon the heat developed by the frictional contact of the shoe with the wheel.

I claim:

1. In a wheel flange lubricator, the combination of a shoe mounted adjacent to the wheel and movable to carry it into engagement with the peripheral surface of the wheel, a receptacle for a lubricant formed in that portion of the shoe whose surface is adapted to contact with the wheel, a passage for the lubricant from the receptacle to the surface of the portion of the shoe adapted to contact with the flange of the wheel, and means for pressing the shoe into contact with the wheel and thereby develop heat by which the lubricant in the receptacle is softened.

2. A wheel flange lubricator comprising a shoe adapted to be mounted adjacent to the wheel of a vehicle and movable toward the wheel, said shoe having a receptacle for a lubricant therein and a passage from the receptacle to the portion of the surface of the shoe which is adapted to contact with the wheel, a spring for pressing the shoe into engagement with the wheel to develop heat whereby the lubricant in the receptacle is softened, and means for effecting an adjustment of the tension of said spring.

3. A wheel flange lubricator comprising the combination of a shoe, a stationary bracket upon which the shoe is pivotally mounted, a receptacle for a lubricant within the shoe, a passage for the lubricant from the receptacle to the surface of the portion of the shoe which contacts with the wheel and a spring connected to the shoe and adapted to turn it about the bracket to force it into engagement with the wheel and thus develop heat which softens the lubricant in the receptacle.

4. A wheel flange lubricator comprising a shoe adapted to engage the peripheral surface of the wheel, a rod from which the shoe is pivotally suspended, springs on opposite sides of the shoe for positioning the latter axially of the rod, said shoe having a receptacle for a lubricant therein and a passage from the receptacle to the surface of the shoe and a spring-actuated member connected with the shoe for turning it about the rod to press the shoe into engagement with the surface of the wheel.

5. A wheel flange lubricator comprising a shoe adapted to be mounted adjacent to a wheel and movable toward and away from the wheel, said shoe having a receptacle therein for a lubricant and a passage for lubricant from the receptacle to the surface of the shoe, a lubricant holder detachably mounted upon the shoe and communicating with the receptacle, a spring-actuated piston in the holder and a spring connected to the shoe for pressing the shoe into contact with the wheel to develop heat by which the lubricant in the receptacle is softened.

6. A wheel flange lubricator comprising the combination of a shoe having a receptacle for a lubricant therein and a passage for the lubricant from the receptacle to the portion of the surface of the shoe which is adapted to contact with the flange of the wheel, a rod from which the shoe is pivotally suspended, springs coiled upon the rod on opposite sides of the shoe, a lubricant holder mounted upon the shoe and in communication with the receptacle within the shoe and a spring-actuated member connected to the shoe at a point distant from said rod for turning the shoe about the rod and pressing it against the flange of the wheel to develop heat whereby the lubricant in the receptacle is softened.

WILLIAM FREDERICK BLACK.

Witnesses:
G. W. STROH,
W. L. LENTZ.